F. H. HENRY.
CAR SEAT STRUCTURE.
APPLICATION FILED DEC. 4, 1906.

974,664.

Patented Nov. 1, 1910.
2 SHEETS—SHEET 1.

Witnesses:
Willa A. Burrowes
Augustus B. Coppes

Inventor
Fred H. Henry
by his Attorneys
Howson & Howson

F. H. HENRY.
CAR SEAT STRUCTURE.
APPLICATION FILED DEC. 4, 1906.
974,664.
Patented Nov. 1, 1910.
2 SHEETS—SHEET 2.
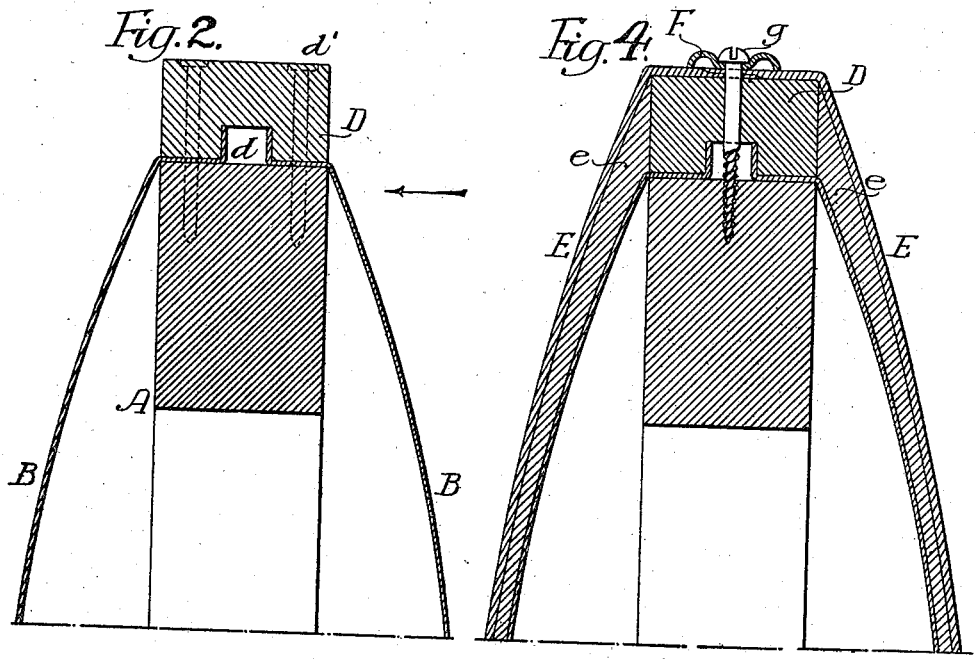
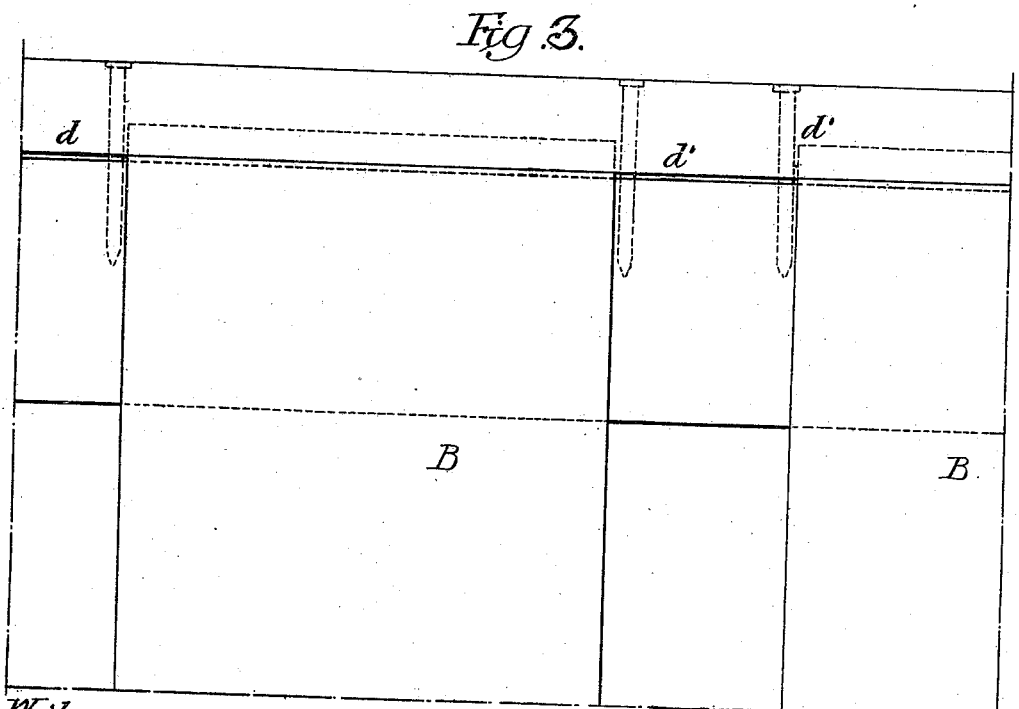

UNITED STATES PATENT OFFICE.

FRED H. HENRY, OF PHILADELPHIA, PENNSYLVANIA, ASSIGNOR TO JOHN A. BRILL, OF PHILADELPHIA, PENNSYLVANIA.

CAR-SEAT STRUCTURE.

974,664.   Specification of Letters Patent.   Patented Nov. 1, 1910.

Application filed December 4, 1906.   Serial No. 346,250.

*To all whom it may concern:*

Be it known that I, FRED H. HENRY, a citizen of the United States, residing in Philadelphia, Pennsylvania, have invented certain Improvements in Car-Seat Structures, of which the following is a specification.

My invention relates to certain improvements in means for securing metallic spring plates to the back frames of a car seat structure.

The main object of my invention is to firmly secure the spring plates to the frame by retaining strips with which the plates interlock, so that the retaining screws can be driven between the plates and not through them.

A further object of the invention is to form the spring plates of a seat back that the screws or nails confining the beading strips can be driven into the main frame without passing through the spring plates.

These objects I attain in the following manner, reference being had to the accompanying drawings, in which:—

Figure 1:
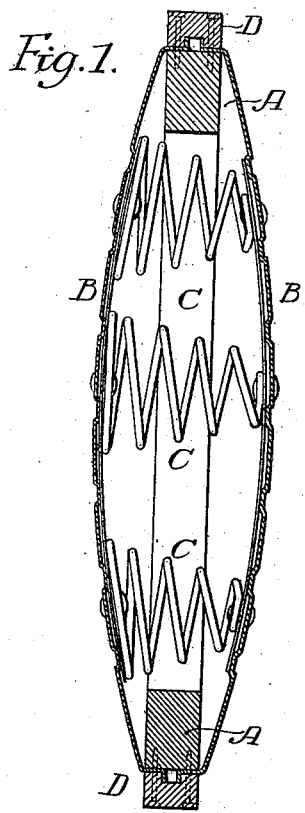
Figure 5:
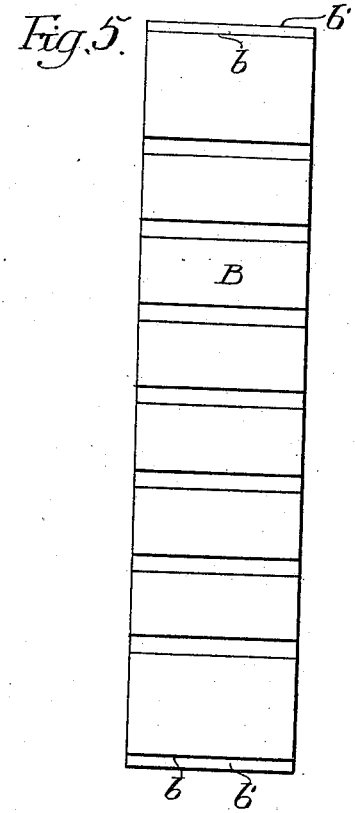
Figure 6:
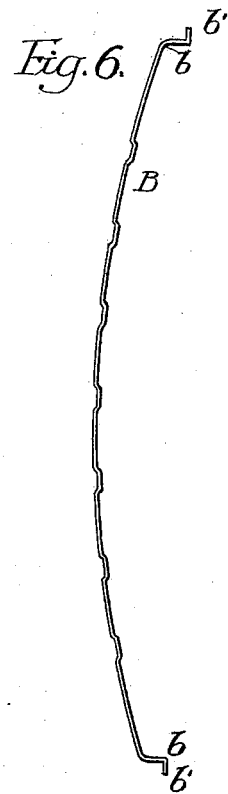

Figure 1, is a vertical sectional view of a car seat back illustrating my invention, the covering being omitted; Fig. 2, is an enlarged view of a detail of Fig. 1; Fig. 3, is a view looking in the direction of the arrow, Fig. 3; Fig. 4, is a view similar to Fig. 3, with the covering and beading strip in place; and Figs. 5 and 6, are detached views of the metallic spring plate.

A is the frame of the car seat back, B, B are the spring plates which are secured to the frame, and between these spring plates are the springs C.

D is a wooden strip in the present instance, which is fastened to the frame and secures the spring plates in position.

E is the upholstered covering, the edges of which preferably overlap each other and are covered by a beading strip F of metal or wood.

*e* represents the padding mounted between the spring plates and the covering. This padding is usually provided when an upholstered covering is used but may be dispensed with when the covering is of ratan mounted on canvas.

The frame A is of wood, quadrangular in cross section, and the strip D is also of wood and also quadrangular in cross section, preferably of the same thickness as the frame A.

In the side of the strip facing the frame is a longitudinal channel *d*.

The spring plates are preferably made of sheet steel shaped in any suitable manner. Each end of each plate is turned down to form a flange *b* so as to fit snugly over the frame A, and each flange is turned up at the extreme end to form a lip *b'*, which extends into the channel *d* in the strip D.

It will be noticed in referring to Fig. 2 that the flange is of such a depth in relation to the thickness of the frame A that the lips of the spring plates on the opposite sides of the frame will be spaced apart. The lips in fact will snugly fit against the side walls of the channel so that the strip D will retain the spring plates rigidly in position. The lips are spaced a sufficient distance apart to allow for the passage of the screw *g*, Fig. 4, which secures the metallic beading strip F to the frame.

The strip D is secured to the frame by nails or screws *d'* which are driven through the strip and into the frame on each side of the metallic spring plates B, as illustrated clearly in Fig. 3. By this arrangement the ends of the metallic plates are held firmly in position without the necessity of driving the nails or screws through the metal of the plate.

It will be understood that the plates are preferably made of thin sheet steel and when the plates are punched for the passage of the nails or screws it is a difficult matter to properly drive the said nails or screws and then the plates would only be held by the small heads of the nails, whereas by my construction each plate is held throughout its entire width by the clamping strip.

If it is necessary to remove any one of the plates for repairs the strip can be readily detached without injuring any of the parts, and a particular strip or spring can be removed and another one substituted with very little trouble.

After the strip D is in position, as illustrated in Fig. 2, the covering is placed over the frame and strip and the overlapping edges are tacked to the strip, and then the beading strip F of metal or wood is placed upon the overlapping edges of the covering so as to protect the raw edge of the fabric or ratan, at the same time the confining screws *g* are preferably of such a length that they will pass entirely through the strip D between the lips of the metallic plates B in the channel $d$ and into the frame A, making a very substantial fastening.

Thus it will be seen by the improved metallic spring plate shown I am enabled to firmly secure the plate to the frame of the back without driving nails or screws through the metal.

The parts can be so designed that the screws or nails for the beading strip can be driven into the frame between the lips of opposite end plates, so that the strip D is held to the frame not only by the nails or screws driven between adjoining plates but also by the screws or nails driven between the ends of opposing plates, making a very rigid and substantial structure.

I claim:—

The combination of a frame, spring plates mounted on opposite sides of the frame, springs mounted between the plates, each plate having a flange at each end turned in so as to fit over the edge of the frame, the lips projecting outwardly from the ends of the flanges, the lips of the spring plate of one side of the frame facing the lips of the spring plate on the opposite side of the frame, with a channeled strip secured to the frame and retaining the plates to the frame, the lips extending into the channel of the strip.

In testimony whereof, I have signed my name to this specification, in the presence of two subscribing witnesses.

FRED H. HENRY.

Witnesses:
Jos. H. Klein,
Wm. A. Barr.